(No Model.)
F. A. GRATER, E. H. WHITNEY & F. S. MANTON.
LOCKING GEAR FOR WINDLASSES.
No. 343,991. Patented June 22, 1886.
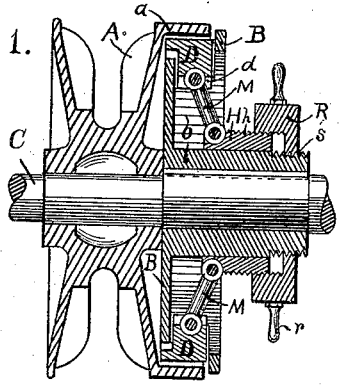
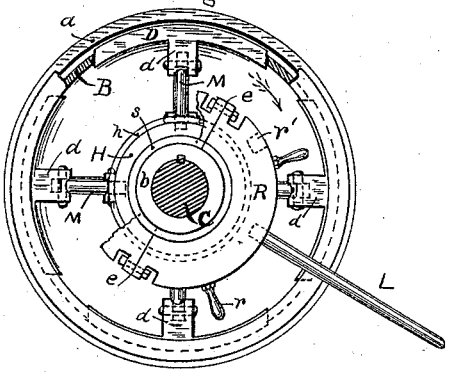
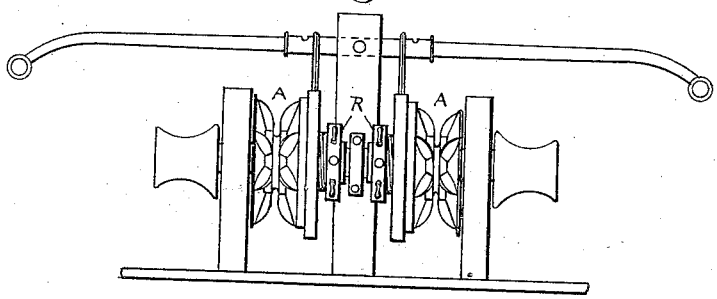
Witnesses.
Frank B Grater.
George L Graham
Inventors.
Francis A Grater
Edwin H Whitney
Frank S Manton

UNITED STATES PATENT OFFICE.

FRANCIS ALLEN GRATER, EDWIN HERBERT WHITNEY, AND FRANK STEAD MANTON, OF PROVIDENCE, RHODE ISLAND, ASSIGNORS TO THE AMERICAN SHIP-WINDLASS COMPANY, OF SAME PLACE.

LOCKING-GEAR FOR WINDLASSES.

SPECIFICATION forming part of Letters Patent No. 343,991, dated June 22, 1886.

Application filed January 16, 1886. Serial No. 188,790. (No model.)

*To all whom it may concern:*

Be it known that we, FRANCIS ALLEN GRATER, EDWIN HERBERT WHITNEY, and FRANK STEAD MANTON, all of Providence, in the county of Providence and State of Rhode Island, have jointly and severally invented certain new and useful Improvements in the Construction of Locking-Gear for Windlasses, of which the following is a specification.

Our present invention relates to the construction of the locking-gear for windlasses; and it consists of improvements upon the invention described and shown in Letters Patent No. 316,259, dated April 21, 1885, wherein the locking-shoes are directly connected by means of links to sliding keys, so that when the said keys are forced inward upon the hub of the driving-head, thereby pressing the locking-shoes against the inner side of the projecting rim of the chain wheel or drum, the pressure exerted between the locking-shoes and the flange of such chain wheel or drum, reacting upon the sliding keys, produces so much friction between the inner surface of said keys and the surface of the grooves in the hub of the driving-head, where the keys are held, that it is a matter of considerable difficulty to force the sliding keys inward without applying a great amount of power to the nut by which the keys are operated.

Our improvements effectually overcome this difficulty, and consist in so connecting the links or bars which are jointed to the locking-shoes that the pressure exerted by one shoe upon the rim of the chain wheel or drum reacts upon the opposite shoe, instead of reacting upon the hub of the driving-head through the sliding key.

Another feature of our improvements is in the construction of the annular operating-nut, the screw-threads cut upon one portion of the interior of which have a different pitch from the screw-threads of the other portion, thus forming what may be called a "differential nut;" and while the screw upon the hub matches the threads of one portion of the nut, the screw-threads upon the periphery of the sliding ring which operates the toggle-links match the threads of the other portion, so that when the nut is turned the ring is advanced or withdrawn by a distance, for each complete turn, equal to the difference in pitch between the threads of the nut which match the screw upon the hub and the threads of the nut which match the screw-threads upon the ring; or, in other words, the amount of motion of the inner ends of the toggles in either direction is measured by a differential movement.

Instead of connecting the locking-shoes by means of toggle-links to sliding keys held within the hub of the driving-head, we connect each shoe by means of a toggle-link to a solid metal ring fitted to slide freely upon the hub of the driving-head, whereby the reacting force of each locking-shoe is transferred to one or more opposed shoes, through the said ring, instead of to the hub of the driving-head. One end of this ring has a screw-thread cut upon its periphery, and it is caused to move in and out upon the hub of the driving-head by an annular nut engaging with the screw-threads upon it, and being suitably connected with the hub.

Figure 1 is a central longitudinal sectional view of a chain-wheel and driving-head containing our improved locking devices, and of the connections of the toggle-links employed therein, the locking-shoes being withdrawn from contact with the rim of the chain-wheel. Fig. 2 is a front or end view of the locking devices, with a portion of the rim of the driving-head and of the operating-nut R broken away to show one locking-shoe and the connections of the toggle-links jointed thereto. Fig. 3 is a front elevation of a hand-brake windlass with our improved locking-gear attached.

In the several figures of the drawings similar parts are designated by the same letters, and where the term "chain-wheel" is used in this specification we intend to include either of the several forms of wheels or drums used in a windlass, whether for a chain, hawser, or rope.

A represents the drum, mounted loosely on the shaft C, and B the driving-head, rigidly mounted thereon.

D represents the locking-shoes; M, the toggle-links which connect two or more of such shoes together; H, the sliding ring through which power is applied to the toggles to force them inward, and thereby press the locking-shoes D against the projecting rim a of the drum A.

b is the hub of the driving-head, on which the ring H is fitted to slide freely, the periphery or curved surface of which has screw-threads h cut upon it, which engage with the screw-threads of an annular nut, R, by which means the said ring is moved in and out upon the hub, when the said nut is turned, by handles r, projecting from it, or by a lever or bar, L, inserted in the sockets r', when greater power is needed.

In Fig. 1 the differential nut R is shown having two sections of screw-threads within it, each of a different pitch from the other, and each extending inward from opposite sides of the nut about one-half its thickness. The hub b has screw-threads cut upon its periphery, the same as those upon the section of the nut which has the greater pitch, which control the movement of the nut R when it is turned thereon. It will be found most convenient to make the nut R in two equal parts and then bolt them together, as shown at e, Fig. 2, after they are placed in position upon the hub of the driving-head, and instead of cutting the screw-threads directly upon the hub b a collar having screw-threads upon its periphery may be keyed thereon. Each link M is pivoted to a lug, d, on each of the locking-shoes, and each locking-shoe D is connected by a toggle-link, M, to the solid metal ring H, which is fitted to the hub of the driving-head so as to slide freely thereon. By this construction the force exerted to press one locking-shoe against the rim of the chain-wheel reacts through the solid ring H upon one or more such shoes opposed thereto without producing any increased friction between the ring H and the hub b.

Instead of cutting screw-threads upon the outer section of the nut R, an annular lip may be left there, which will fit into a corresponding annular groove in the hub of the driving-head, and thus serve the purpose of a thrust-collar. This modified form of construction may be advantageously employed in windlasses of the smaller sizes, and where a great amount of power is not required.

The operation of our improved locking devices is as follows, to wit: The screw-threads on the end of the hub b and those on the portion of the nut which engage them are of a little greater pitch than those upon the sliding ring H and upon the other portion of the nut; consequently when the nut R is turned from left to right, as indicated by the arrow, Fig. 2, it advances toward the chain-wheel upon the hub b, and carries with it the sliding ring H. At the same time the ring H, being capable of sliding freely on the hub, is drawn away from the chain-wheel; but, as heretofore explained, the pitch of the threads upon the hub b and upon the portion of the nut which engages with them is greater than the pitch of the threads upon the sliding ring H and upon the other portion of the nut, so that when the nut is turned, as indicated above, the advance of the inner ends of the links M toward the chain-wheel is equal to the difference between the movement of the nut R in that direction and the movement of the ring in the opposite direction, which advance is measured by the difference in pitch between the screw-threads upon the hub and the corresponding threads upon one portion of the nut and those upon the sliding ring and the corresponding threads upon the other portion of the nut for each revolution made. It is evident that a reverse movement of the nut R will cause the ring H, together with the ends of the toggles attached thereto, to move away from the chain-wheel, and thus relieve the pressure between its rim and the locking-shoes, as indicated by the position shown in Fig. 1. This construction of the operating-nut and the other parts of the mechanism operated by it enables us to make the screw-threads coarse and large, thereby obviating the possibility of stripping the threads, and also diminishing the wear upon them; also, by reason of this differential movement of the parts, it requires no more power to produce a given pressure by one complete turn of the nut than it would with a nut and screw having a thread of the same pitch throughout, which would produce the same resulting movement by one complete turn of the nut. Besides, the operator is able so easily to produce an amount of pressure in excess of that needed to securely lock the driving-head and chain-wheel together that the frictional surfaces of the locking-shoes and the rim of the chain-wheel may be oiled, which will greatly reduce the amount of wear between them.

We claim—

1. In a windlass having a chain-wheel mounted loosely on the shaft of the driving-head, the combination of two or more locking-shoes, toggle-links connected therewith, a nut for operating the same, sliding connections between such nut and the toggle-links, and differential screw-threads within the nut engaging with corresponding screw-threads upon a fixed hub on the shaft and sliding connections, respectively, substantially as described, and for the purpose specified.

2. In a windlass having a drum or chain-wheel mounted loosely on the shaft of the driving-head, the combination of two or more locking-shoes located within the rim of the drum, a metal ring sliding upon the hub of the driving-head, connected to said shoes by toggle-links, and an operating-nut having differential screw-threads within it, which engage with screw-threads upon the hub and the sliding ring, respectively, substantially as described.

FRANCIS ALLEN GRATER.
EDWIN HERBERT WHITNEY.
FRANK STEAD MANTON.

Witnesses:
FRANK B. GRATER,
HENRY B. ROSE.